Dec. 20, 1966     M. M. MARKOWITZ     3,293,187
OXYGEN-GENERATING PRODUCT
Filed Oct. 23, 1963
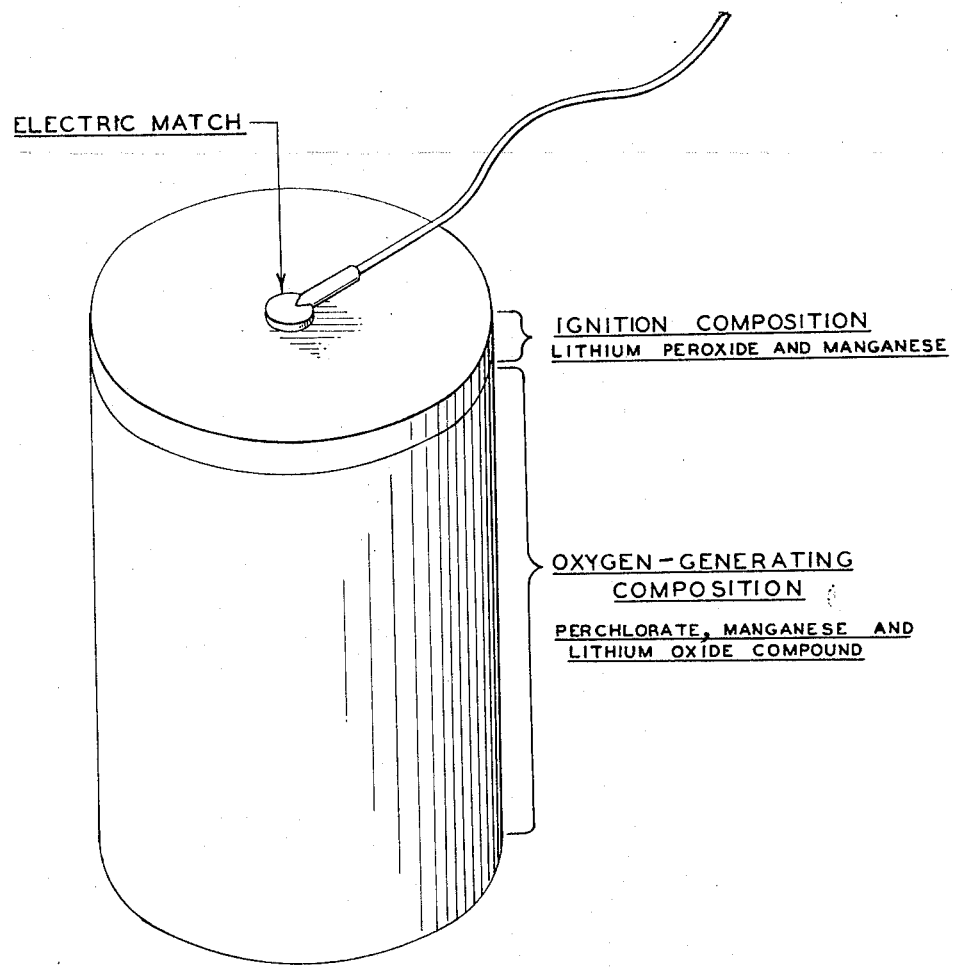
INVENTOR:
MEYER M. MARKOWITZ
BY
Howson & Howson
ATTYS.

United States Patent Office 3,293,187
Patented Dec. 20, 1966

3,293,187
OXYGEN-GENERATING PRODUCT
Meyer M. Markowitz, Ardmore, Pa., assignor to Foote Mineral Company, Exton, Pa., a corporation of Pennsylvania
Filed Oct. 23, 1963, Ser. No. 318,223
14 Claims. (Cl. 252—186)

The present invention relates to a novel oxygen-generating composition; and, more particularly, the invention relates to an oxygen-generating composition, preferably in the form of a candle, capable of generating substantially pure oxygen without the production of noxious gases, such as chlorine. The invention also relates to a novel oxygen-generating product comprising, in addition to and in association with said oxygen-generating composition, a novel ignition composition.

There is a need for supplemental oxygen for human respiration in high altitude aircraft, submarines, space vehicles, mines, sealed environments and the like places where access to normal atmospheric air supplies is limited or impossible. Liquid oxygen itself has frequently been used for this purpose but presents the difficulties of the need for refrigerated storage, the loss of oxygen by normal boil-off irrespective of use and hence limited storage life, the need for close proximity of the oxygen production facility to the point of use of the liquid oxygen and consequent logistic disadvantages and the need for excessively large containers due to the relatively low density of liquid oxygen. Liquid oxygen also presents fire hazards, especially when used in the vicinity of hypergolic fuels. Furthermore, the proper metering of oxygen gas from liquid oxygen necessitates a fairly elaborate system of valving and pressure-flow controls. Oxygen gas under high compression and stored in steel cylinders, while possessing good shelf life, requires relatively heavy, high-pressure containers and pressure- and flow-regulating equipment.

Another approach to an efficient, dense, reliable oxygen supply is to utilize chemically combined oxygen which, by appropriate treatment, can be converted to molecular oxygen. Thus, there have been suggestions to thermally decompose an oxygen-containing compound, like an alkali metal chlorate or perchlorate. However, since the heats of decomposition of such compounds are insufficient to sustain their pyrolyses once initiated, it is necessary to supply heat continually. While this thermal requirement could be met by an extraneous heat source, such as an electric heater, it has been found more convenient to mix a small amount of an oxidizable fuel with the oxygen-containing compound such that the heat released by the oxidation-reduction reaction upon ignition is sufficient to sustain the thermal decomposition of the oxygen-containing compound in a continuous and self-propagating fashion. The fuels that have been suggested include iron and magnesium. In addition, since some chlorine gas is evolved upon the thermal decomposition of the chlorates and perchlorates, it has been suggested to employ barium peroxide to suppress or retard chlorine liberation.

However, the oxygen-generating compositions heretofore employed or suggested have possessed disadvantages and limitations. Among these are: low oxygen content, evolution of chlorine, high fuel requirements and an inherent chemical instability rendering them susceptible to accidental explosions.

It is the principal object of the present invention to provide a novel oxygen-generating composition.

It is another object of the present invention to provide a novel oxygen-generating composition which, upon thermal decomposition, provides oxygen gas in an efficient manner substantially free of chlorine gas or other gases.

It is a further object of the present invention to provide a novel oxygen-generating composition that will decompose thermally in a continuous and self-propagating manner at a relatively low temperature.

Still another object of the present invention is to provide a novel oxygen-generating product comprising the stated oxygen-generating composition and, in addition thereto and in association therewith, a novel ignition composition.

Other objects, including the provision of a novel ignition composition, will become apparent from a consideration of the following specification and the claims.

The novel oxygen-generating composition of the present invention consists essentially of an intimate mixture of an alkali metal perchlorate, manganese metal powder and a finely divided lithium oxide compound selected from the group consisting of lithium oxide, lithium hydroxide and lithium peroxide; the perchlorate being present in an amount between about 90 and about 60 mol percent and the manganese being present in an amount between about 10 and about 40 mol percent, these percentages being based on the perchlorate and manganese, and the lithium oxide compound being present in an amount between about 3 and about 6%, by weight, based on the weight of the perchlorate.

The composition of the present invention has many important advantages over prior oxygen-generating compositions. In the first place, the potential oxygen content is relatively high since lithium perchlorate contains 60.1% by weight of available oxygen, sodium perchlorate contains 52% and potassium perchlorate contains 46.2%. Of all the oxygen-containing metal compounds, lithium perchlorate is the most efficient on a weight and volume contained oxygen basis. Indeed, on a volume basis, lithium perchlorate contains about 30 weight percent more oxygen than liquid oxygen itself. In the second place, it has been found that the present composition, upon thermal decomposition, evolves substantially pure oxygen gas which is substantially or entirely free of other gases, especially chlorine. The suppression of the evolution of chlorine in accordance with the present invention is occasioned by the presence of the lithium oxide compound as well as the use of manganese as the fuel. Manganese, unlike other possible metallic fuels, does not promote chlorine evolution. Thus, boron and silicon have very high heats of combustion, but they cannot be used as a fuel with an alkali metal perchlorate to produce oxygen because these materials promote chlorine evolution from the decomposing perchlorate. In addition, manganese oxides have been found to have pronounced catalytic effects on the decomposition of the alkali metal perchlorates. Thus, the thermal decomposition temperature of lithium perchlorate has been determined to be lowered by about 100° C. in the presence of the manganese oxide reaction products. Metals such as aluminum and magnesium, while having higher heats of combustion than manganese, are ineffective in promoting the catalytic decomposition of the perchlorates. The use of iron as a fuel is unsatisfactory because of its low heat of combustion which would therefore necessitate relatively large amounts in order to produce the requisite amount of heat for decomposition of the excess perchlorate.

For further understanding of the present invention, reference may be made to the accompanying drawing in which FIGURE 1 illustrates an oxygen-generating product comprising the above-described oxygen generating composition in association with an ignition mixture and an electric match for ignition.

Referring further to the perchlorate which is the principal source of oxygen in the oxygen-generating composition of the present invention, this will be, as stated, an alkali metal perchlorate, namely, a perchlorate of lithium, sodium or potassium. Lithium perchlorate is especially preferred. Since the composition of the present invention is prepared by mixing the solid ingredients together, the perchlorate will be in particulate form. In this connection, the exact particle size is not critical since the perchlorate melts upon thermal decomposition and it may be granular or in powder form. To achieve high density compositions in compacted (compressed) form, it is desirable to employ relatively fine perchlorates, such as material which substantially passes through a 50 mesh screen. One form that has been found particularly useful in this regard is one in which 1% is retained on a 50 mesh screen and 90% is retained on a 150 mesh screen.

The principal fuel employed in the oxygen-generating composition of the present invention is powdered metallic manganese. While, as stated, this material has a lower heat of combustion than metals like boron, silicon, aluminum and magnesium, it does not promote chlorine evolution from the decomposition of the perchlorate as does the former two, and its oxidation products formed during burning of the composition exert a pronounced catalytic effect on the decomposition of the perchlorate which has not been found to be the case with the other metals. This is not to say, however, that a minor proportion (less than 50 mol percent) of the manganese could not be replaced by metallic fuels like aluminum and magnesium; since, by such replacement, one can obtain the benefit of the high heat of combustion of the aluminum or magnesium and still retain the catalytic effect of the manganese. However, in accordance with the preferred embodiment of the present invention, substantially all of fuel component is the manganese. It is preferred that the manganese be in very finely divided (powder) form; that is to say, substantially all thereof should pass through a 230 mesh screen. One form of metallic manganese that has been found to be particularly useful is one in which 99.1% passes through a 325 mesh screen and 38.1% has a particle size less than 10 microns. This material has a specific surface area of 1.95 square meters per gram.

The third essential component of the oxygen-generating composition is a lithium oxide compound. This may be lithium oxide ($Li_2O$) itself or it may be lithium hydroxide (LiOH) or lithium peroxide ($Li_2O_2$). Lithium peroxide is especially preferred. As in the case of the manganese, it is preferred that the lithium oxide compound be in very finely divided (powder) condition. One form of lithium peroxide that has been found especially useful is one having a specific surface area of about 10 square meters per gram. It has been found that, when mixing this material with the perchlorate, the more finely divided lithium peroxide coats the particles of perchlorate.

Other materials may be incorporated in the oxygen-generating composition without deleteriously altering the advantageous characteristics thereof. For example, a small amount of an inert refractory filler, such as asbestos fibers, may be included to improve the structure of the burned residue.

In the oxygen-generating composition, the proportions of the principal ingredients may vary somewhat. In this connection, several factors may have a bearing on the proportions actually selected; the amount of insulation surrounding the composition—the more insulation the less manganese required; the rate of oxygen evolution desired—the higher the rate, the more manganese required; the relative ease of ignition required—the more manganese, the greater the ease of ignition. However, the higher the proportion of manganese, the lower the oxygen content of the oxygen-generating composition per unit weight. Generally, as between the perchlorate and the manganese, the former will be present in an amount between about 90 and about 60 mol percent, preferably between about 85 and about 75 mol percent, and the latter will be present in an amount between about 10 and about 40 mol percent, preferably between about 15 and about 25 mol percent, based on the weight of the two. The lithium oxide compound will generally be present in an amount between about 3 and about 6, preferably between about 4.5 and about 5.5, percent, by weight, based on the weight of the perchlorate. A particularly preferred oxygen-generating composition contains about 80 mol percent of lithium perchlorate and about 20 mol percent of manganese, with about 4.5–5.5 percent, by weight, of lithium peroxide based on the weight of the lithium perchlorate.

In preparing the oxygen-generating composition, the materials, in solid form, are simply mixed together. In accordance with preferred practice, the alkali metal perchlorate and the lithium oxide compound are initially mixed together following which the manganese is added. This insures the lithium oxide compound coming into close contact, as by coating, with the alkali metal perchlorate. Following mixing, it is advantageous to compress the mixture into a coherent body, and this can be done simply by pressing the mixture into a confined space conforming to the desired ultimate shape at a pressure in the range of about 9500 to about 20,000 p.s.i. Advantageously, the mixture is compressed into the form of a candle, that is to say in the form of a cylinder.

While the above-described oxygen-generating composition is suitable per se for generating oxygen gas by thermal decomposition upon ignition, it is preferred to associate therewith an ignition composition that is more readily ignitable, as by means of a simple electric match. An ignition composition found especialy suitable in this reward, is a mixture of lithium peroxide and manganese metal powder. These materials will be finely divided as discussed above. The relative proportions of the lithium peroxide and maganese may very somewhat; generally the former being present in an amount between about 30 and about 75 mol percent, preferably between about 65 and about 75 mol percent, and the latter being present in an amount between about 70 and about 25 mol percent, preferably between about 35 and about 25 mol percent, based on the weight of the two. An especially advantageous ignition mixture is one containing about 70 mol percent of lithium peroxide and about 30 mol percent of manganese. As in the case of the oxygen-generating composition, the ignition composition is preferably compressed into a coherent body having a shape, such as a disc, adapted to fit in contact with the compressed oxygen-generating composition. The ignition mixture can readily be ignited by an electric match such as those utilized in igniting explosives. Once ignited, it will in turn readily ignite the oxygen-generating composition.

Referring then to the drawing, the figure is an illustration of a preferred form of the over-all oxygen-generating product in the form of a candle consisting of the oxygen-generating composition and the ignition composition. The oxygen-generating composition has been compressed into a cylinder—or candle— and the ignition mixture has been compressed into a disc having the same diameter as the cylinder of oxygen-generating composition. As shown in the drawing, a conventional electric match may be attached to the ignition mixture. The entire product may then be held in a suitable container advantageously provided with thermal insulation. Ignition of the match causes ignition of the ignition mixture which in turn ignites the oxygen-generating composition. The nature of the latter is such that combustion of the manganese fuel and the thermal decomposition of the perchlorate takes place in a uniform, self-propagating manner until the entire oxygen-generating composition is consumed.

Should it be desirable to facilitate ignition of the ignition composition a small amount of a sensitizer may be placed between the match and the ignition composition. Such a sensitizer is made up of manganese metal powder and an alkali metal perchlorate such as those mentioned above. The range of proportions of the manganese and the perchlorate may range from between about 65 to about 95, preferably between about 75 and about 85, mol percent of the manganese, and between about 35 and about 5, preferably between about 25 and about 15, mol percent of the perchlorate, based on the weight of the two.

The following examples illustrate the present invention and are not intended to limit the scope thereof in any way.

*Example I*

417.7 grams of a mixture of 80 mol percent of lithium perchlorate, 20 mol percent of manganese metal powder and 5 grams of lithium peroxide per 100 grams of lithium perchlorate are prepared from the following materials: the lithium perchlorate has a particle size such that 1 percent by weight is retained on a 50 mesh screen and 90 percent by weight is retained on a 150 mesh screen; the manganese metal powder is such that 99.1 percent passes through a 325 mesh screen and 38.1 percent has a particle size less than 10 microns (a specific surface area of 1.95 square meters per gram); and the lithium peroxide has a particle size such that it has a specific surface area of about 10 square meters per gram. The perchlorate and the lithium peroxide are initially mixed together to coat the lithium perchlorate particles with the lithium peroxide, following which the manganese metal powder is added and mixed in. The mixture is then compressed to a cylinder $2\frac{3}{4}$ inches in diameter by $2\frac{5}{16}$ inches in height in a hardened steel dye with double-end pressing at 15,000 lbs. per square inch pressure.

An ignition mixture is prepared, weighing 10 grams, of 70 mol percent of lithium peroxide and 30 mol percent of manganese metal powder compressed to a disc of the same diameter as the aforementioned oxygen-generating composition. The 10 gram disc is placed on top of the oxygen-generating cylinder and an electric match is inserted in the ignition disc.

Upon firing of the electric match, and ignition of the ignition disc and oxygen-generating cylinder, measurements of the system weight loss and the volume of gas evolved show about 80 weight percent of the system has been liberated as chlorine-free oxygen gas.

Sodium perchlorate or potassium perchlorate may be substituted in whole or in part for the lithium perchlorate of the foregoing example with comparable results, bearing in mind, however, that the sodium and potassium perchlorates have a lower oxygen content than does lithium perchlorate as discussed earlier herein.

*Example II*

This example illustrates the effect of the lithium oxide compound in suppressing the evolution of chlorine gas. Oxygen-generating cylinders are prepared as in Example I, containing 400 grams of a mixture of 80 mol percent of lithium perchlorate and 20 mol percent of manganese metal powder, in which the amount of lithium oxide, lithium peroxide or lithium hydroxide varies as set forth in the following table. The cylinders are pressed under 15,000 pounds per square inch pressure, to cylinders of $2\frac{1}{2}$ inches in diameter by $2\frac{1}{4}$ inches in height. The cylinders are associated with ignition discs, prepared as in Example I, to which are attached electric matches as in Example I and each product is ignited. The gases evolved are passed through potassium iodide solution to determine the amount of chloride. The results are as follows:

TABLE I

| Per 100 gs. of Lithium Perchlorate | | | Chlorine Gas Evolved in Grams per 400 Gram Sample | | |
|---|---|---|---|---|---|
| Gs. of $Li_2O$ | Gs. of $Li_2O_2$ | Gs. of LiOH | (For $Li_2O$) | (For $Li_2O_2$) | (For LiOH) |
| 0 | 0 | 0 | 2.10 | 2.10 | 2.10 |
| 1 | 1 | 1 | 0.61 | 0.19 | 0.58 |
| 2 | 2 | ---- | 0.09 | 0.19 | ---- |
| 3 | 3 | 3 | 0.02 | 0.012 | 0.14 |
| 4 | 4 | ---- | 0.01 | 0.001 | ---- |
| 5 | 5 | ---- | 0.0000 | 0.0000 | ---- |
| 6 | 6 | 6 | 0.0000 | 0.0000 | 0.014 |

Modification is possible in the selection of the particular materials as well as in the proportions thereof without departing from the scope of the invention.

I claim:

1. An oxygen-generating composition consisting essentially of an intimate mixture of an alkali metal perchlorate selected from the group consisting of sodium-, potassium- and lithium perchlorate manganese metal powder and a lithium oxide compound selected from the group consisting of lithium oxide, lithium hydroxide and lithium peroxide, the perchlorate being present in an amount between about 90 and about 60 mol percent and the manganese metal powder being present in an amount between about 10 and about 40 mole percent, said percentages being based on the weight of the two said ingredients, and the lithium oxide compound being present in an amount between about 3 and about 6%, by weight, based on the weight of the alkali metal perchlorate.

2. The composition of claim 1 wherein said perchlorate is lithium perchlorate.

3. The composition of claim 1 wherein said lithium oxide compound is lithium peroxide.

4. The composition of claim 1 wherein said perchlorate is lithium perchlorate, and wherein said lithium oxide compound is lithium peroxide.

5. An oxygen-generating composition consisting essentialy of an intimate mixture of an alkali metal perchlorate selected from the group consisting of sodium-, potassium- and lithium perchlorate, manganese metal powder and a lithium oxide compound selected from the group consisting of lithium oxide, lithium hydroxide and lithium peroxide, the alkali metal perchlorate being present in an amount between about 85 and about 75 mol percent and the manganese metal powder being present in an amount between about 15 and about 25 mol percent, said percentages being based on the weight of the two said ingredients, and the lithium oxide compound being present in an amount between about 4.5 and about 5.5%, by weight, based on the weight of the alkali metal perchlorate.

6. The composition of claim 5 wherein said alkali metal perchlorate is lithium perchlorate.

7. The composition of claim 5 wherein said lithium oxide compound is lithium peroxide.

8. The composition of claim 5 wherein said alkali metal perchlorate is lithium perchlorate, and wherein said lithium oxide compound is lithium peroxide.

9. The composition of claim 1 in the form of a candle.

10. The composition of claim 5 in the form of a candle.

11. An oxygen-generating product comprising the composition of claim 1 in the form of a candle in physical contact with a mixture of lithium peroxide and manganese metal powder in the proportions of between about 30 and about 75 mol percent of the lithium peroxide and between about 70 and about 25 mol percent of the manganese.

12. An oxygen-generating product comprising the composition of claim 5 in the form of a candle in physical contact with a mixture of lithium peroxide and manganese metal powder in the proportions of between about 65 and about 75 mol percent of the lithium peroxide and between about 35 and about 25 mol percent of the manganese.

13. An oxygen-generating composition consisting essentially of lithium perchlorate, manganese metal powder and lithium peroxide, the lithium perchlorate being present in an amount of about 80 mol percent and the manganese being present in an amount of about 20 mol percent, said percentages being based on the content of lithium perchlorate and manganese, and the lithium peroxide being present in an amount about 4.5 and about 5.5%, by weight, based on the weight of the lithium perchlorate.

14. An oxygen-generating product consisting essentially of the composition of claim 13 in the form of a candle in physical contact with an ignition mixture consisting essentially of an intimate mixture of about 70 mol percent of lithium peroxide and about 30 mol percent of manganese metal powder.

References Cited by the Examiner
UNITED STATES PATENTS

| | | | |
|---|---|---|---|
| 1,882,365 | 10/1932 | Lubelsky | 149—22 |
| 2,410,801 | 11/1946 | Audrieth | 149—22 XR |
| 2,469,414 | 5/1949 | Schechter | 252—187 |
| 3,174,936 | 3/1965 | Gustafson | 252—186 |

OTHER REFERENCES

Rose: "The Condensed Chemical Dictionary," 6th ed., 1961, Reinhold Pub. Co., New York, page 677.

LEON D. ROSDOL, *Primary Examiner.*

JULIUS GREENWALD, *Examiner.*

M. WEINBLATT, *Assistant Examiner.*